Patented Sept. 22, 1931

1,824,069

UNITED STATES PATENT OFFICE

BENJAMIN T. BROOKS, OF GREENWICH, CONNECTICUT, AND EUGENE J. CARDARELLI, OF NEWARK, NEW JERSEY, ASSIGNORS TO PETROLEUM CHEMICAL CORPORATION, A CORPORATION OF DELAWARE

DIETHYL ESTER

No Drawing.    Application filed August 16, 1930.   Serial No. 475,854.

This invention relates specifically to the diethyl ester of Δ 4 cyclohexene 1.2 dicarboxylic acid, and will be fully understood from the following description. We may employ the said acid either in a form of the acid or its anhydride, and both such forms will be denoted generically in this specification and claims by the phrase "Δ 4 cyclohexene 1.2 dicarboxylic acid". The said acid may be made by combining maleic acid or the anhydride thereof with butadiene. For this purpose the butadiene and maleic acid or anhydride are mixed and preferably heated to temperatures of from 95 to 120° C. The reactants are preferably present in substantially equimolar proportions and are retained under sufficient pressure during the reaction period to hold the butadiene in liquid phase. We may alternatively mix the maleic acid or its anhydride with hydrocarbon mixtures containing butadiene, or we may add a solvent, such as benzol, to the reaction mixture.

In one procedure we may, for example, take the products of extensive cracking of petroleum oil as, for example, products of liquid phase cracking carried out at high temperatures say above 950° F. or in vapor phase at any pressure, and preferably separate therefrom a fraction the olefine content of which consists predominantly of olefines of 4 carbon atoms to the molecule. Such a fraction prepared for example from the products of vapor phase cracking carried out at atmospheric pressure and temperatures between 1050 and 1150° F. may contain between 10 and 30% of butadiene. We preferably, however, separate the butadiene from such a fraction by the process described in co-pending application Serial No. 433,426, and after separation of substantially pure butadiene therefrom admix said butadiene with maleic acid or its anhydride, thereby forming Δ 4 cyclohexene dicarboxylic acid anhydride. The diethyl esters of this acid may be made by warming said acid or anhydride with ethyl alcohol preferably in the presence of a catalyst such as, for example, a catalyst which in the ordinary organic reactions facilitates the splitting off of water. One convenient method of carrying out the reaction is to warm the reacting constituents to the boiling point of the alcohol present while refluxing any vaporized alcohol. One convenient method of operation consists in heating the reacting components to the boiling point, condensing the vapors, permitting the condensate to stratify, and returning the alcohol layer to the still. In this way any excess of water originally present or formed during the reaction, in excess of that which is soluble in the alcohol condensed, will be removed from the reaction zone thereby facilitating the process.

An alternative procedure consists in adding a small quantity, say not in excess of 20% by weight, of benzol to the liquid reactants and then heating the ternary system so formed to the boiling point. The vapors are then condensed and stratified and the benzol alcohol layer is returned to the still. This system also permits withdrawing of any excess of water from the reaction zone and facilitates the progress of the reaction.

In generating the said diethyl ester, normal ethyl alcohol is heated with the said acid, and in this case up to about 5% by weight of 80% sulphuric acid may be employed as a catalyst. The said mixture may be heated up to the boiling point of the alcohol present for a period of hours, and at the expiration of this time the excess of alcohol together with any water formed may be distilled off. We find it convenient to work with slightly more than 2 mols of alcohol for each mol of acid, although the materials may, if desired, be mixed in any proportions and the excess of either component may be separated at the conclusion of the reaction.

After distilling off the excess of alcohol and water, the crude ester is neutralized, for example, with sodium carbonate, to neutralize any sulphuric acid present, and the pure ester may be separated by vacuum distillation. We have found that the diethyl ester boils at about 133 to 137° C. under 5 mm. of mercury pressure.

The hereinabove described ester is a colorless and practically odorless oily fluid. It is a solvent for gums, resins, nitro cellulose, cellulose acetate, etc. It may be employed in combination with other solvents in the formation of lacquers, practically those lacquers comprising cellulose esters, and is particularly valuable as a high boiling point plasticizer for lacquer films.

The foregoing specific description is for purposes of illustration and not of limitation. It is therefore our intention that the invention be limited only by the appended claims or their equivalents in which we have endeavored to claim broadly all inherent novelty.

We claim:

1. The diethyl ester of Δ 4 cyclohexene dicarboxylic acid.

2. The new compound corresponding substantially to the formula

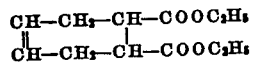

3. A solvent mixture for cellulose esters comprising the diethyl ester of Δ 4 cyclohexene dicarboxylic acid.

BENJAMIN T. BROOKS.
EUGENE J. CARDARELLI.